(12) United States Patent
Porat

(10) Patent No.: US 8,149,836 B2
(45) Date of Patent: Apr. 3, 2012

(54) METHOD AND SYSTEM FOR RELAYING FRAMES THROUGH AN ETHERNET NETWORK AND BRIDGE THEREFOR

(75) Inventor: Hayim Porat, Tel Aviv (IL)

(73) Assignee: Tejas Israel Ltd, Herzilya Pitvach (IL)

( * ) Notice: Subject to any disclaimer, the term of this patent is extended or adjusted under 35 U.S.C. 154(b) by 71 days.

(21) Appl. No.: 11/852,350

(22) Filed: Sep. 10, 2007

(65) Prior Publication Data

US 2008/0062994 A1 Mar. 13, 2008

(30) Foreign Application Priority Data

Sep. 10, 2006 (IL) .......................................... 177974

(51) Int. Cl.
*H04L 12/28* (2006.01)
*H04L 12/56* (2006.01)

(52) U.S. Cl. ........................................ 370/392; 370/401

(58) Field of Classification Search ........................ None
See application file for complete search history.

(56) References Cited

U.S. PATENT DOCUMENTS

| | | | |
|---|---|---|---|
| 2001/0005369 A1* | 6/2001 | Kloth .............................. | 370/392 |
| 2002/0010800 A1 | 1/2002 | Riley et al. | |
| 2003/0026246 A1* | 2/2003 | Huang et al. .................. | 370/352 |
| 2004/0042454 A1* | 3/2004 | Zabihi et al. .................. | 370/392 |
| 2004/0047353 A1* | 3/2004 | Umayabashi et al. ... | 370/395.63 |
| 2004/0081203 A1* | 4/2004 | Sodder et al. ................. | 370/469 |
| 2005/0138149 A1* | 6/2005 | Bhatia ............................ | 709/220 |
| 2005/0220096 A1* | 10/2005 | Friskney et al. .............. | 370/389 |
| 2006/0002370 A1* | 1/2006 | Rabie et al. .................... | 370/351 |
| 2006/0098571 A1* | 5/2006 | Takefman ...................... | 370/222 |
| 2006/0198323 A1* | 9/2006 | Finn .............................. | 370/256 |
| 2007/0086333 A1* | 4/2007 | Doukai et al. ................ | 370/228 |
| 2007/0258462 A1* | 11/2007 | Veits ........................ | 370/395.31 |
| 2008/0008182 A1* | 1/2008 | Deng ............................ | 370/392 |
| 2008/0049621 A1* | 2/2008 | McGuire et al. ........... | 370/236.2 |
| 2008/0159174 A1* | 7/2008 | Enomoto et al. .............. | 370/256 |

FOREIGN PATENT DOCUMENTS

WO    WO 2006/070197    * 6/2006

OTHER PUBLICATIONS

"IEEE Standards for Local and Metropolitan Area Network: Virtual Bridged Local Area Networks", LAN MAN Standards Committee of the IEE Computer Society, IEEE Std 802.1Q, Dec. 1998, whole document.*

"IEEE P802.1ad/D6.0—Virtual Bridged Local Area Networks—Amendment 4: Provider Bridges", Draft Amendment to IEEE Std 802.1Q, Interworking Task Group of IEEE 802.1, Aug. 2006, entire document.*

* cited by examiner

*Primary Examiner* — Chirag Shah
*Assistant Examiner* — Suk Jin Kang
(74) *Attorney, Agent, or Firm* — Deborah Gador

(57) ABSTRACT

A method for relaying Ethernet frames over an Ethernet network, the method including adding a tag that provides an address from a hierarchical address scheme to an Ethernet frame; and relaying the Ethernet frame through the network according to the tag. There is also provided a configurable Ethernet bridge having a filtering database including a plurality of subnet masks for relaying frames according to a hierarchical address scheme.

15 Claims, 3 Drawing Sheets

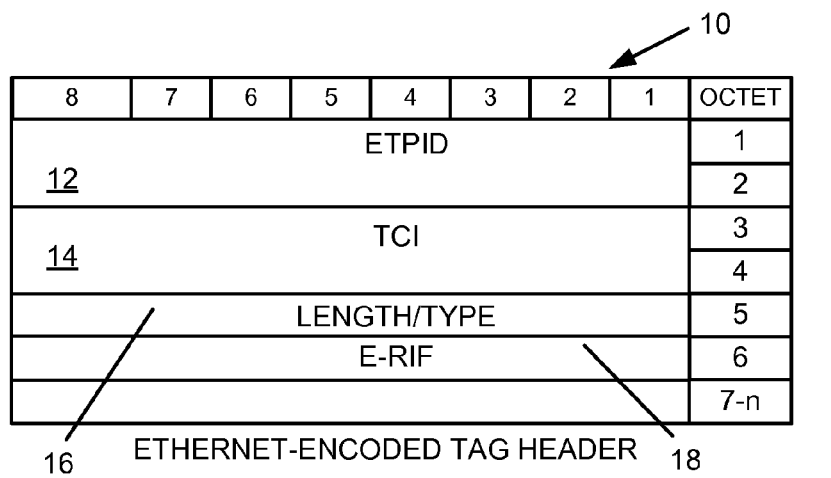
PRIOR ART FIG. 1A
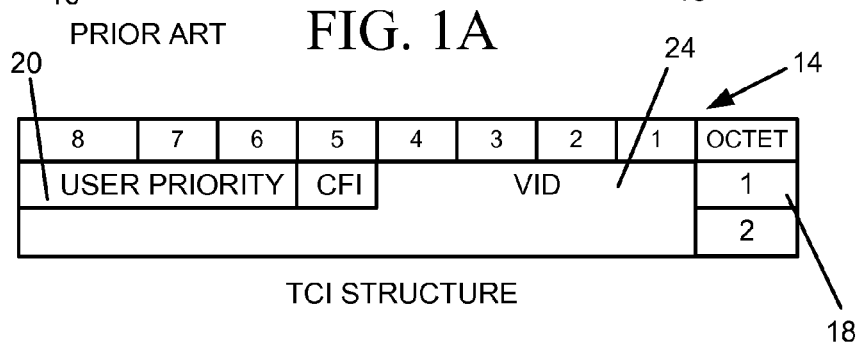
PRIOR ART FIG. 1B
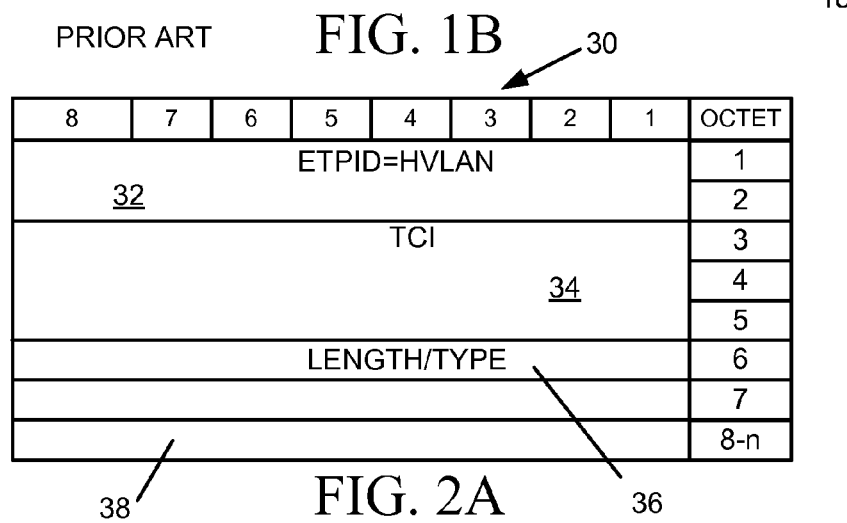
FIG. 2A
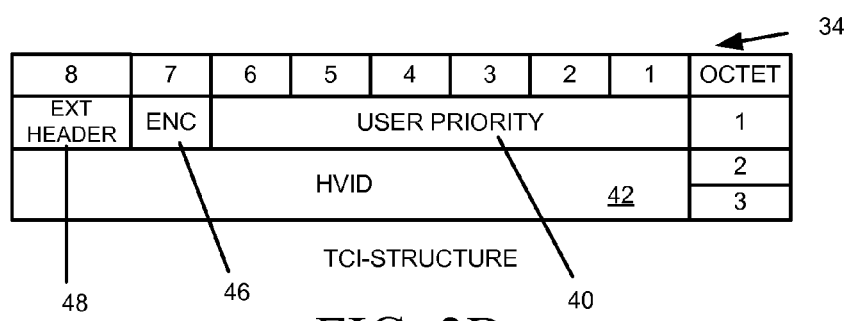
FIG. 2B Option 2: TCI structure 28 bit HVID + 6 bit priority Option 3: TCI structure 24 bit HVID + 3 bit priority Option 4: TCI structure 32 bit HVID + 3 bit priority

METHOD AND SYSTEM FOR RELAYING FRAMES THROUGH AN ETHERNET NETWORK AND BRIDGE THEREFOR

FIELD OF THE INVENTION

The present invention relates to Ethernet communications systems, in general and, in particular, to a novel bridge and Ethernet frame for an Ethernet network.

BACKGROUND OF THE INVENTION

Ethernet is a connectionless oriented technology. It does not have a routing mechanism and its address scheme is based on 48-bit MAC addresses. However, its address scheme is flat and non-hierarchical and, thus, is not scaleable. In order to provide greater capacity, a partitioning scheme, named VLAN, was introduced.

A VLAN, or virtual LAN, is a logical group of LAN segments, independent of physical location, with a common set of requirements. Several VLANs can co-exist on a single physical switch. VLANs are configured through software rather than hardware, which makes them extremely flexible. Frames having a VLAN tag carry an explicit identification of the VLAN to which they belong. The value of the VLAN Identification (VID) in the tag header signifies the particular VLAN the frame belongs to. This additional tag field appears in the Ethernet protocol.

The format of a typical VLAN frame 10 having an Ethernet encoded tag header is illustrated schematically in FIGS. 1*a* and 1*b*. As can be seen, frame 10 includes an Ethernet-coded Tag Protocol Identifier (ETPID) 12 of 2 Bytes, Tag Control Information (TCI) 14 in 2 Bytes, an indicator 16 of the type or length of the payload in the frame, and data 18, a sequence of n Bytes of any value $42=<n=<1496$. The total frame minimum is 64 Bytes.

The TCI field 14, shown in detail in FIG. 1*b*, includes 3 bits indicating the User Priority 20, generally as defined in the user's Quality of Service agreement. This arrangement can indicate up to eight ($2^3$) priority levels. It further includes a CFI (Canonical Format Indicator) 22. CFI 22 is used for compatibility reasons between Ethernet type networks and old-fashioned Token Ring type networks, and indicates whether the frame can be forwarded to an Ethernet port, or if it can only pass through a Token Ring network. The VID 24, the identification of the VLAN used by the standard 802.1Q, is also part of TCI 14. It has 12 bits and allows the identification of 4096 ($2^{12}$) VLANs. 2 bytes 16 are utilized to indicate Length/Type. This field indicates either the number of MAC-client data bytes that are contained in the data field of the frame, or the frame type ID.

Frames are relayed through a series of bridges in the network. Each bridge has a VLAN filtering database, which contains rules for forwarding a received data frame. The forwarding is done based on the data frame's destination MAC address and associated VID. The filtering database contains both management configured static information and dynamically learnt information during the bridge operation. In the filtering database, information related to MAC addresses are known as filtering information and the information related to VLANs are known as registration information. Among the decisions made according to the rules in the database is whether the frame is to be unicast (forwarded through a single port) or multicast (forwarded simultaneously through several ports).

The main problem with VLAN is its limited VID space (4096). While this space may suffice for enterprise applications, it is much too small for carrier networks, which must support many customers and services.

A number of solutions have been proposed for this scalability problem. First is so called Q in Q, also known as Provider Bridge, VLAN stacking or tag stacking, which allows service providers to insert an additional VLAN tag (referred to as provider VLAN) in the Ethernet frame in order to identify the service, resulting in a unique 24-bit length label. While this solution enables one, in theory, to identify up to 16 million services (4094*4094), in reality, one provider VLAN is dedicated to one customer, and therefore the number of supported customers is still limited to 4094.

An alternative proposed solution is known as MAC-in-MAC, described in the proposed IEEE 802.1ah Provider Backbone Bridges standard. The MAC-in-MAC name refers to the way the standard encapsulates Ethernet frames with a Service Provider MAC header. MAC-in-MAC technology overcomes the inherent scalability limitations of VLANs and Q-in-Q networks that make them impractical for use in larger networks by enabling up to 4000 times as many service instances as supported by traditional VLAN and Q-in-Q networks. Because the switches at the edge encapsulate the traffic with a service provider MAC address, the other switches in the core need only learn the MAC addresses of the core switches.

However, this method also suffers from disadvantages. There are scalability problems using MAC addresses for forwarding decisions. The added TAGs are flat, and are separated, so that choosing an I tag for one customer prevents other customers from reusing the concatenated tags. Furthermore, the added multiple tags augment the frames by some 128 bits, which can be a significant overhead, particularly when dealing with small (64 byte) packets associated with real time applications, such as voice and video.

Accordingly, there is a long felt need for an Ethernet addressing scheme which is scalable beyond conventional VLAN, and it would be very desirable to have an Ethernet frame for embodying such a scheme and an Ethernet bridge for forwarding frames utilizing such a scheme.

It is also known to divide IP networks into smaller networks, called subnetworks or subnets. Subnetting provides the network administrator with several benefits, including extra flexibility, more efficient use of network addresses, and the capability to contain broadcast traffic (a broadcast will not cross a router). Subnets are under local administration. As such, the outside world sees an organization as a single network and has no detailed knowledge of the organization's internal structure.

An IP subnet address is created by "borrowing" bits from the host field and designating them as the subnet field. The number of borrowed bits varies and is specified by a subnet mask, which is stored in the router's routing tables. A subnet mask is a bitmask used to tell how many bits identify the subnetwork, and how many bits provide room for host addresses. Subnet masks use the same format and representation technique as IP addresses.

During IP routing, these subnet masks are used to determine the network (or more specifically, the subnetwork) address. First, the router extracts the IP destination address from the incoming packet and retrieves the internal subnet mask. It then performs a logical AND operation to obtain the network number. This causes the host portion of the IP destination address to be removed, while the destination network number remains. The router then looks up the destination network number and matches it with an outgoing interface. Finally, it forwards the frame to the destination IP address. Subnet masks are not known for use in Ethernet networks.

SUMMARY OF THE INVENTION

There is provided according to the present invention a method for relaying Ethernet frames over an Ethernet network, the method including adding a tag that provides an address from a hierarchical address scheme to an Ethernet frame, and relaying the Ethernet frame through the network according to the tag.

According to one embodiment of the invention, the step of relaying includes applying at least one subnet mask in a filtering database of an Ethernet bridge to the address for relaying the frame according to the hierarchical address scheme.

According to another embodiment, the step of relaying includes applying at least one subnet mask in a filtering database of an Ethernet bridge to MAC address for relaying the frame according to the hierarchical address scheme.

There is also provided an Ethernet frame including an Ethernet TPID and an address from a hierarchical address scheme (HVID). Preferably, the frame also includes a user priority indication, preferably larger than 3 bits.

The Ethernet frame of the invention may further comprise a bit indicating presence or absence of encapsulation and/or a bit indicating presence or absence of an extended HVLAN Header.

There is further provided according to the invention, an Ethernet bridge including a program for identifying and relaying Ethernet frames of the present invention, and a filtering database using hierarchical addressing and incorporating an appropriate subnet mask.

There is further provided according to the invention, an Ethernet bridge including a program for identifying and relaying Ethernet frames of the present invention, and a filtering database using hierarchical addressing and best match method (e.g. longest prefix, least cost, etc.)

There is also provided according to the invention, an Ethernet network including a plurality of bridges supporting 802.1 Ethernet standards, at least a portion of the bridges supporting HVLAN frames having a hierarchical addressing forwarding scheme, each bridge having a filtering database including a plurality of forwarding entries, including subnet masks for relaying frames according to hierarchical addresses, and/or a combination of hierarchical addresses and/or MAC and/or Port There is still further provided, according to the invention, a method for building a filtering database for an Ethernet bridge including: providing a filtering database compatible with frames having a Hierarchical VLAN tag in an Ethernet bridge, the filtering database including a field of subnet mask; and adding a rule of best match.

Preferably, the method further includes enabling a hierarchical scheme of MAC addresses by employing subnet masks and best match methodologies.

BRIEF DESCRIPTION OF THE DRAWINGS

The present invention will be further understood and appreciated from the following detailed description taken in conjunction with the drawings in which:

FIG. 1a is a schematic illustration of a prior art Ethernet frame;

FIG. 1b is a schematic illustration of a prior art TCI structure in the Ethernet frame of FIG. 1a;

FIG. 2a is a schematic illustration of an Ethernet frame constructed and operative in accordance with one embodiment of the present invention;

FIG. 2b is a schematic illustration of a TCI structure according to one embodiment of the invention in the Ethernet frame of FIG. 2a;

FIG. 4 is a schematic illustration of a TCI structure according to one embodiment of the invention in the Ethernet frame of FIG. 2a;

FIG. 5 is a schematic illustration of a TCI structure according to an alternative embodiment of the invention in the Ethernet frame of FIG. 2a; and FIG. 6 is a schematic illustration of a TCI structure according to another embodiment of the invention in the Ethernet frame of FIG. 2a.

DETAILED DESCRIPTION OF THE INVENTION

Figure 3:
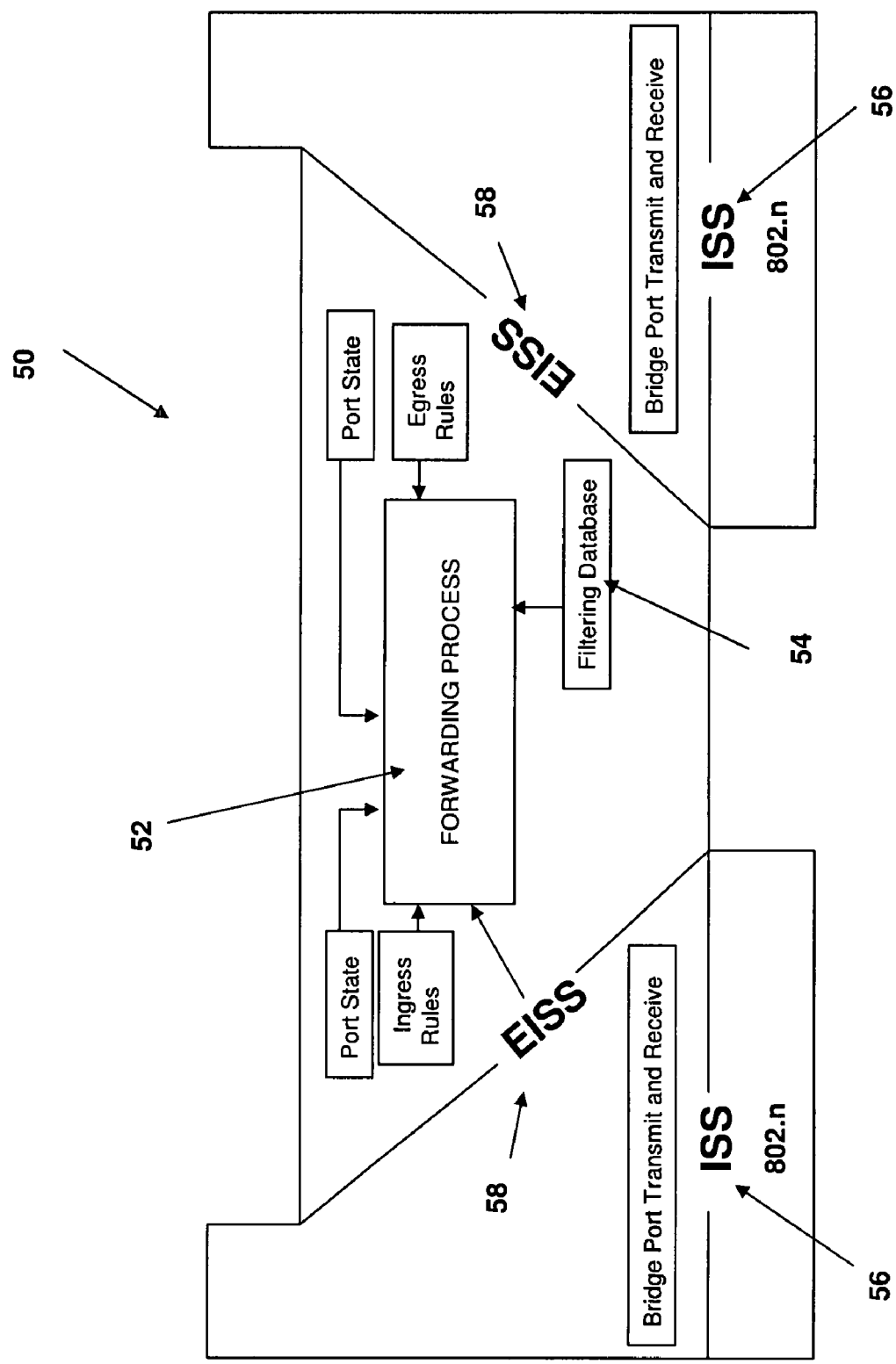
FIG. 3 is a schematic illustration of an Ethernet bridge according to one embodiment of the invention.

The present invention provides a method for relaying Ethernet frames over an Ethernet network, the method including adding a tag, that provides an address from a hierarchical address scheme to an Ethernet frame and relaying the Ethernet frame through the network according to the address. The tag may be a Hierarchical HVLAN identifier (HVID), described below, or a hierarchical MAC address.

The present invention further relates to a novel Ethernet frame for forwarding through novel Ethernet bridges in an Ethernet network according to the present invention, providing a new Ethernet type for an extended VLAN called HVLAN (Hierarchical VLAN). The Ethernet frame includes a tag according to the invention, herein referred to as an HVLAN tag, of at least 24 bits, which serves to identify a group of frames for relaying purposes, defining a forwarding tree of service, without requiring a router or bridge to read any MAC addresses inside the frames. The Ethernet frame further includes enlarged user priority, relative to the prior art, e.g., 4 bits or more, rather than 3 bits. These HVLAN frames can be forwarded through configurable Ethernet bridges according to the invention, which include a filtering database using hierarchical addressing and incorporating an appropriate subnet mask for each filtering rule (i.e., each database entry should include a port, HVID and subnet mask, as a minimum). It will be appreciated that the use of a subnet mask permits both classless and class based forwarding. The network must support 802.3 Ethernet standard, preferably 802.1q.

The Ethernet network of the present invention enables a hierarchical scheme of HVLAN tags by employing subnet masks and best match methodologies. The hierarchy and number of levels can be defined during configuration.

The proposed solution is based on a new Ethernet-coded Tag Protocol Identifier (ETPID) that is based on the VLAN methodology. Referring now to FIGS. 2a and 2b, there is shown the format of a novel HVLAN frame 30 having an Ethernet encoded tag header. Frame 30 includes a new ETPID 32, generally of 16 bits, to identify the frame as an HVLAN frame. It will be appreciated that this ETPID will be different from that in VLAN frames. Frame 30 also includes Tag Control Information (TCI) 34 in 4 Bytes described below, an indicator 36 of the type or length of the payload in the frame, and data 38, a sequence of n Bytes of any value where $42 =< n$.

The TCI field 34, shown in detail in FIG. 2b, includes at least 4 Bits, and preferably 6 bits as shown, indicating the User Priority 40, generally as defined in the user's Quality of Service agreement. It will be appreciated that the additional Bit or Bits permit 16 ($2^4$), or more, gradations of user priority, rather than only eight, as in conventional VLAN frames. Utilizing 6 bits instead of 3 bits provides compatibility with DiffServe headers.

Since HVLAN frames will not be forwarded over old-fashioned token ring bridges, TCI field 34 does not include a CFI. Length and type Bytes 36 are available, as in conventional Ethernet frames. This field indicates either the number of MAC-client data bytes that are contained in the data field of the frame, or the frame type ID.

An HVID 42, the identifier of the HVLAN, which will be used by the standard yet to be developed, is also part of TCI 34. It is a particular feature of the invention that the HVID 42 has at least 24 bits (3 octets) (rows 3,4,5 of frame 30), which allows the identification of at least $2^{24}$ different HVLANs, and is completely hierarchical. Thus, the problem of scalability is solved for the network.

The HVID can be local or global. With a local HVID, the HVLAN identification is unique only in the bridge, so the same HVID can be re-used using tag swapping in several places in the network. However, traffic engineering is problematic. With a global HVID, the HVID is unique for a customer in the entire network. Global is preferred, since the frame is self-describing, i.e., when the HVLAN is read, the bridge knows where it originally came from (what was the network ingress port) and which port it goes out (network egress port). The disadvantage of global is that, if the HVID is changed, all the filtering databases along its path over the network must be reconfigured.

A bit 46, indicating whether the data is an encapsulated customer frame is provided in TCI 34. A plurality of reserved bits may be provided for later definition or, as illustrated in FIG. 2b, an extension indicator bit 48 may be provided to indicate whether the TCI header is extended. Such an extension bit enables future expansion of the Header. The current header value is "0" (not extended).

An Ethernet bridge 50 according to one embodiment of the invention is illustrated schematically in FIG. 3. Bridge 50 includes a switching processor 52, a filtering database 54, and at least two ports 56. Filtering database 54 includes, in addition to the address forwarding scheme stored in conventional filtering databases, a plurality of subnet masks associated with the HVLAN tags or MAC addresses. Preferably, switching processor 52 includes algorithms for detecting best match between several rules in the filtering database, and rules to identify the need for encapsulation, stripping, tagging or untagging. An EISS 58 may be provided in the bridge to carry out encapsulation and stripping. The switching processor 52 can be programmed by configuring mechanisms in a management station in the network, or by independent registration protocols.

The population of the filtering database by the individual entries is carried out in an automatic, self adjusting way, e.g. learning and flooding and/or by using registration protocols. Alternatively, it can be accomplished using static entries registration, using managements tools.

In the automatic mode, the individual entries in the filtering database are pruned, i.e. grouped together with the calculated relevant dynamic subnet mask, using any pruning algorithm that is local to the individual bridge and, thus, can be open to different algorithmic implementations. During network planning, a hierarchical addressing scheme for HVIDs is built. Alternatively, automatic registration protocols, such as GARP, can be utilized in order to build the hierarchy.

The hierarchy, and the data resulting from the hierarchy, can be dynamic or static. The particular subnet mask can be changed using algorithms in each bridge, protocols and/or by the management station in the network. In standard filtering databases, each VID must have its own unique entry, even if different VIDs have the exact same forwarding rule. The use of subnet masks enables pruning of the filtering database according to the address scheme by combining the rules of several HVIDs into one rule, using a matching subnet (e.g., all HVIDs that have a prefix of 83c will be forwarded using the same rule). Since prefixes have no meaning in VLANs, and since subnet masks do not exist in standard bridges, this cannot be achieved with conventional VLANs.

In addition, the subnet mask can be used to filter and prune MAC address rules in the filtering database.

Thus, the bridge 50 is pre-programmed to know which bits of the HVID or MAC must be read for forwarding information, and which can be ignored for that particular hop. Preferably, an algorithm for best match or longest prefix (similar to that used in IP routing) runs in switching processor 52. It will be appreciated that an address can have different subnet masks, i.e., one can look at the first three bits, while another only looks at the first two bits. The algorithm for best match utilizes the rule that has the most bits in the subnet mask, e.g., the longest matching address with the highest number of matching bits, or any other rule used to define best match, such as least cost, etc.

According to the present invention, either the HVID, only, can be used in the filtering decision, or the MAC address can be read and utilized, as well. A tag may be added to indicate whether or not to relate to the MAC address. This may be accomplished by indicating an encapsulated frame, like MAC-in-MAC. In this way, the added MAC address resulting from MAC-In-MAC will be learnt, but learning of customer MACs will be disabled for non-encapsulated frames carrying the customers' MACs. Thus, forwarding will be done solely on HVLAN/subnet masks tags (or HVLAN/subnet mask+ port), and no new rules will be created in the filtering database based on customers' MACs. When the frame has been encapsulated, a bit in the HVLAN tag will indicate this fact, and it will be stripped as it approaches its final destination. As known, encapsulation can be total or shim. Shim is generally more efficient.

It will be appreciated that HVLAN frames must be backbone compatible. If it is desired to forward an HVLAN frame via an older network (which does not have HVLAN bridges), encapsulation can be utilized. In this case, each HVLAN is encapsulated with a backbone MAC. Preferably, the backbone MAC is composed of the HVLAN address and added 24 bits. Thus, B-MAC tags can be built. A preferred embodiment uses 6 Bytes, wherein three are the HVLAN itself, and three other Bytes are provided at the prefix of the address. Since non HVLAN compliant bridges will not recognize the HVLAN ETPID, they will relay HVLAN frames using the backbone MAC address. The bridge applies filtering according to the backbone MAC, only. In this way, new HVLAN frames can be made compatible with old equipment.

Preferably, the filtering database is programmed on the basis of VLAN methodology, so that broadcast or multi-cast is possible (i.e., a frame having certain HVLAN rules will be transmitted out of several ports simultaneously). This multicast capability is provided by retaining the filtering database ability to define several ports per VID, or in this case HVID, so a frame corresponding to that rule will be relayed to several ports of the same bridge.

It is a particular feature of the HVLAN network of the invention that it is scalable, since the bridge does not have to look at the MAC address for forwarding purposes and since pruning of the HVID space can be accomplished using subnet masks and best match rules.

Operation of the network is substantially the same as a VLAN network, and operation of a bridge according to the present invention is substantially the same as a VLAN bridge. The difference is the operation of the filtering database. In the filtering database of the present invention, an HVLAN frame is identified by the ETPID of the frame. The filtering database searches for the appropriate rule or rules that match the HVID of the frame. The search for rules in the filtering database is carried out, not necessarily according to the entire HVID, but to the portion which matches one or more subnet masks. If more than one suitable subnet mask is found, the best match is chosen, according to the definition of best match programmed into the filtering database. Once the best match is chosen, relaying through the bridge is carried out utilizing similar forwarding process functions as those detailed in IEEE 802.3q.

The filtering database also reads the encapsulation bit indicating whether or not the frame was encapsulated, and whether it should be stripped before being relayed to the egress port. On the other hand, there can be a rule in the filtering database that certain HVLAN frames must be encapsulated before being relayed to the egress port. If this is the case, an EISS in the bridge will encapsulate the frame, as known.

The proposed Ethernet HVLAN system has a number of advantages. The use of one large scale HVID enables simple and hierarchical carrier networks without resorting to tag swapping or stacking. A large number of different HVIDs can be forwarded while using a small size filtering database. Traffic engineering is easy, due to the ability to allocate HVLAN address space and subnet mask per domain, geographical area, etc. However, HVID swapping is possible, if desired. The hierarchical subnet mask based forwarding enables significant reduction and scaling of the filtering databases in core networks. Since forwarding may be done by HVID only, there is no need to encapsulate frames, in most cases, since the customers' MACs are not learned. The system has the ability to decide whether to encapsulate or not enable encapsulation using, for example MAC-in-MAC, so it is possible to traverse legacy-based networks without overloading the filtering databases with customers' private MACs. One bit in the HVLAN tag can indicate whether or not the frame has been encapsulated. And, since HVLAN has the same logic as VLANs, it is compatible with all current methodologies (e.g. spanning tree protocols, GVRP, etc.).

It will be appreciated that different TCI's, including larger HVIDs or different tag division or components, can be defined, according to the invention, in addition to TCI 34 of FIG. 2b. Several non-limiting examples are presented in FIGS. 4, 5 and 6.

Figure 4:
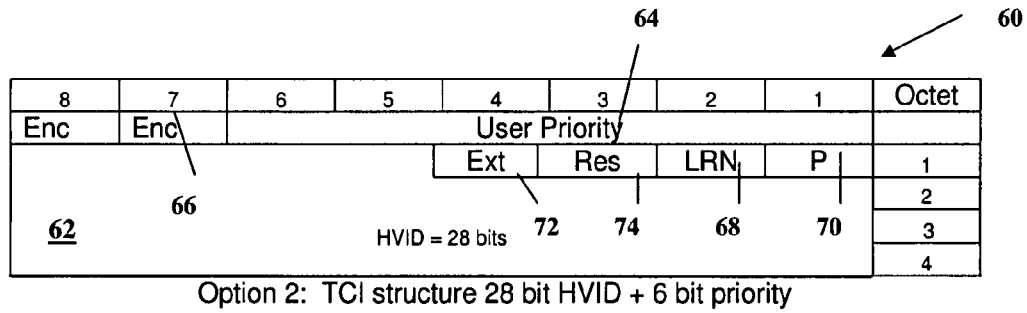

Referring now to FIG. 4, there is shown a TCI 60 including an HVID 62 of 28 bits. This header includes 6 bits 64 defining user priority, instead of 3 bits. This provides compatibility with DiffServe headers. In addition, TCI 60 includes two bits 66 for encapsulation (instead of one), to indicate whether the data is an encapsulated customer frame. The use of two bits permits indication of MAC encapsulation (where the frame outer MAC is a provider MAC), VLAN encapsulation (where the 12 LSB (least significant bits) of the HVID header are derived from an original VLAN tag), both MAC and VLAN encapsulation, or no encapsulation at all. VLAN encapsulation enables efficient VLAN frame transport across an HVLAN network without encapsulating the entire frame, by merely replacing its VLAN header with an HVID header, while preserving its VLAN ID.

TCI 60 further includes an LRN bit 68. This bit permits Disablement/Enablement of learning of the frame MAC address during transmission of HVLAN frames. This enables carriers to disable learning of clients' private MACs when using HVLAN frames without encapsulation. In addition, a P bit 70 is provided to Enable/Disable reading and/or other processing of internal Ethernet frames tags. As known, internal tags can be utilized in Ethernet frames, beyond the HVID. This bit enables carriers to ignore the content of clients' frames (such as IP data), for security and faster processing, while enabling processing of OAM or other carrier generated frames.

An Extension bit 72 is preferably provided to indicate whether the header has been extended or not. When it has not been extended, extension bit 72 will be 0. If it is desired to expand the header in the future, the extension bit will indicate this fact. And preferably, one bit 74 is reserved for future definition.

Figure 5:
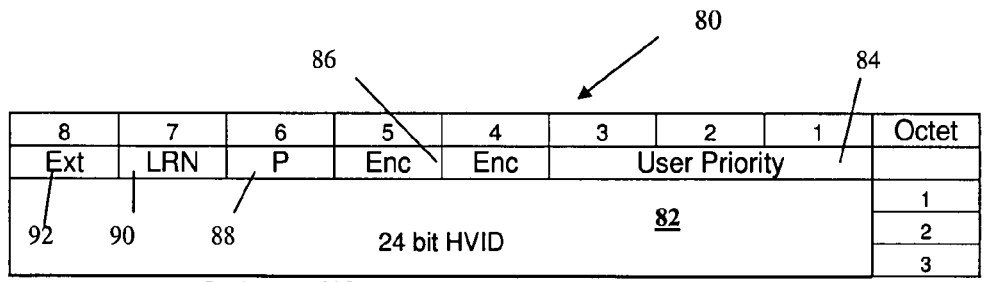

Referring now to FIG. 5, there is shown a TCI 80 including an HVID 82 of 24 bits. This header includes 3 bits 84 defining user priority, two bits 86 indicating encapsulation, as in FIG. 4, a P bit 88, an LRN bit 90, and an extension bit 92.

Figure 6:
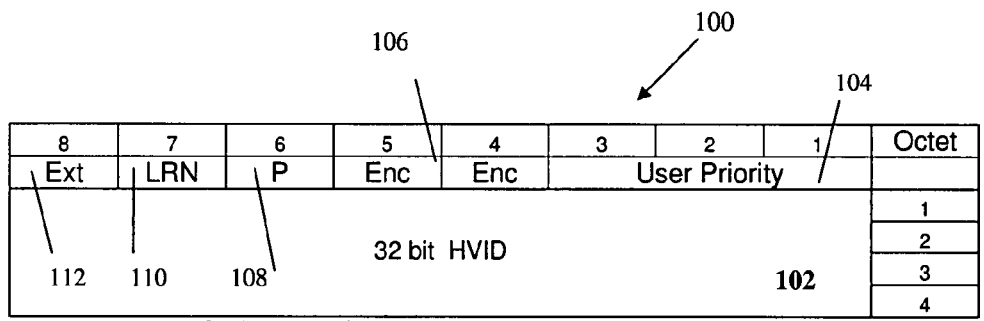

With reference to FIG. 6, there is shown a TCI 100 including an HVID 102 of 32 bits. This header also includes 3 bits 104 defining user priority, two bits 106 indicating encapsulation, as in FIG. 4, a P bit 108, an LRN bit 110, and an extension bit 112. It will be appreciated by those skilled in the art that the larger the HVID, the more addresses can be provided in a network. However, at the same time, significant overhead is added, so these factors must be taken into consideration when deciding how to define the network headers.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A method of relaying Ethernet frames over an Ethernet network, the method comprising:

building, for an Ethernet network, a classless hierarchical address scheme describing a multipoint forwarding tree, said address scheme permitting pruning according to said forwarding tree;

assigning an identification tag that includes an address from said hierarchical address scheme to each group of frames forwarded together, to identify said group for forwarding purposes, wherein said address is at least one address selected from the group consisting of a classless hierarchical MAC address and Hierarchical VLAN identifier (HVID);

adding one of said identification tags to each Ethernet frame;

identifying said address in a filtering database of an Ethernet frame;

selecting at least one forwarding rule from said filtering database for said identification tag by applying at least one subnet mask by detecting a forwarding rule that is a best match from a plurality of forwarding rules obtained for said address; and relaying said Ethernet frame through the network according to said at least one forwarding rule.

2. The method according to claim 1, wherein said step of selecting at least one forwarding rule includes detecting a forwarding rule that is a best match from a plurality of forwarding rules obtained for said address from the application of a plurality of subnet masks in said filtering database.

3. The method according to claim 1, wherein said step of relaying includes multicast through more than one egress port of said Ethernet bridge.

4. The method according to claim 1, further comprising providing an indication of disablement/enablement of learning of a frame MAC address during transmission of said tagged frames.

5. The method according to claim 1, further comprising providing an indication of disablement/enablement of processing of internal Ethernet tags during transmission of said tagged frames.

6. A configurable Ethernet bridge comprising:
a filtering database including:
a plurality of entries from a classless hierarchical address forwarding scheme describing multipoint forwarding trees, wherein said address is at least one address selected from the group consisting of a classless hierarchical MAC address and Hierarchical VLAN identifier (HVID);
a subnet mask associated with each said entry, wherein said subnet masks are adapted for relaying frames according to at least one of: said hierarchical address, or a combination of a hierarchical address and at least one of a MAC address and a Port address, by detecting a forwarding rule that is a best match from a plurality of forwarding rules obtained for said address from the application of said subnet masks in said filtering database; and
at least one egress port associated with each said entry.

7. The Ethernet bridge according to claim 6, wherein said subnet masks are adapted for relaying frames according to at least one of: said hierarchical address, or a combination of a hierarchical address and at least one of a MAC address and a Port address.

8. The Ethernet bridge of claim 6, further comprising:
at least two ports for receiving and transmitting Ethernet frames;
said filtering database having a plurality of forwarding rules, each rule including:
a hierarchical VLAN identifier;
a subnet mask; and
at least one of said egress ports; and
a switching processor that can process said filtering database rules.

9. The Ethernet bridge according to claim 8, wherein said switching processor includes algorithms for detecting said forwarding rule that is a best match from a plurality of forwarding rules obtained for said address from the application of a plurality of subnet masks in said filtering database.

10. The Ethernet bridge according to claim 8, wherein said switching processor can be programmed by configuring mechanisms in a management station in the network.

11. The Ethernet bridge according to claim 8, wherein said switching processor can be programmed by registration protocols.

12. The Ethernet bridge according to claim 6, wherein:
the bridge further includes an Enhanced Internal Sublayer Service (EISS); and
said filtering database includes means for identifying from bits in a frame header a need for encapsulation, stripping, tagging or untagging, and means for causing said EISS to do so.

13. An Ethernet network comprising:
a plurality of bridges supporting 802.1 Ethernet standards;
at least a portion of said bridges supporting hierarchical VLAN (HVLAN) frames, each frame having an address selected from a classless hierarchical addressing scheme describing a multipoint forwarding tree, wherein said address is at least one address selected from the group consisting of a classless hierarchical MAC address and a Hierarchical VLAN identifier (HVID);
each bridge having a filtering database including:
a plurality of subnet masks for relaying frames according to at least one of: said hierarchical address, a combination of said hierarchical address and a MAC address, and a combination of said hierarchical address and a Port address;
a plurality of forwarding rules obtained for said address from the application of said plurality of subnet masks from a forwarding rule that is a best match can be detected.

14. The Ethernet network according to claim 13, further including a management station according to 802.3 Ethernet standards to manage at least some of said bridges.

15. A method of building a filtering database for an Ethernet bridge comprising:
populating a filtering database with entries, each entry including:
a hierarchical tag including an address from a classless hierarchical address forwarding scheme describing a multipoint forwarding tree, wherein said address is at least one address selected from the group consisting of a classless hierarchical MAC address and Hierarchical VLAN identifier (HVID),
an egress port, and
a subnet mask adapted for relaying frames according to at least one of: said hierarchical address, or a combination of a hierarchical address and at least one of a MAC address and a Port address; and
including, in the bridge, algorithms for detecting a forwarding rule that is a best match from a plurality of forwarding rules obtained for one said address from the application of a plurality of subnet masks in said filtering database.

* * * * *